US009711966B2

(12) United States Patent
Haeffner et al.

(10) Patent No.: US 9,711,966 B2
(45) Date of Patent: Jul. 18, 2017

(54) METHOD AND DEVICE FOR MONITORING A CONVERTER

(71) Applicant: Robert Bosch GmbH, Stuttgart (DE)

(72) Inventors: Juergen Haeffner, Gaertringen (DE); Albert Geiger, Eberdingen (DE); Domenic Garcea, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 403 days.

(21) Appl. No.: 14/369,784

(22) PCT Filed: Nov. 5, 2012

(86) PCT No.: PCT/EP2012/071803
§ 371 (c)(1),
(2) Date: Jun. 30, 2014

(87) PCT Pub. No.: WO2013/102505
PCT Pub. Date: Jul. 11, 2013

(65) Prior Publication Data
US 2015/0061388 A1 Mar. 5, 2015

(30) Foreign Application Priority Data
Jan. 4, 2012 (DE) .................. 10 2012 200 067

(51) Int. Cl.
*H02J 4/00* (2006.01)
*B60R 16/03* (2006.01)
(Continued)

(52) U.S. Cl.
CPC ............... *H02J 4/00* (2013.01); *B60R 16/03* (2013.01); *H02H 7/10* (2013.01); *H02M 1/32* (2013.01); *Y10T 307/367* (2015.04)

(58) Field of Classification Search
CPC .. H02J 4/00; B60R 16/03; H02H 7/10; H02M 1/32; Y10T 307/367
See application file for complete search history.

(56) References Cited

U.S. PATENT DOCUMENTS

2001/0004205 A1* 6/2001 Miller ................... H02J 7/1423
323/224
2003/0234634 A1* 12/2003 Lee ..................... H02M 3/1582
323/241

(Continued)

FOREIGN PATENT DOCUMENTS

| CN | 102132477 A | 7/2011 |
| EP | 2 267 876 A1 | 12/2010 |
| JP | 2008199747 | 8/2008 |

OTHER PUBLICATIONS

International Search Report for PCT/EP2012/071803, issued on Feb. 13, 2013.

(Continued)

*Primary Examiner* — Jared Fureman
*Assistant Examiner* — Rafael Pacheco
(74) *Attorney, Agent, or Firm* — Norton Rose Fulbright US LLP; Gerard Messina

(57) ABSTRACT

A converter is described, in particular a DC/DC converter for use in a motor vehicle, including: a converter circuit, which is situated between a first network and a second network to convert a direct current or alternating current at an input terminal on the input side into a direct current or alternating current at the output terminal on the output side, the direct current or alternating current on the input side and the direct current or alternating current on the output side being based on a shared potential; a first monitoring circuit, which is situated between the input terminal and the converter circuit to detect a current flow into the converter circuit; a second monitoring circuit, which is situated between the output terminal and the converter circuit to detect a current flow into the converter circuit; a first separation element, which is situated between the input terminal and the converter circuit to establish a connection between the input terminal and the converter circuit and/or (Continued)

a second separation element, which is situated between the output terminal and the converter circuit, to establish a connection between the output terminal and the converter circuit.

11 Claims, 2 Drawing Sheets

(51) Int. Cl.
H02M 1/32 (2007.01)
H02H 7/10 (2006.01)

(56) References Cited

U.S. PATENT DOCUMENTS

| | | |
|---|---|---|
| 2009/0207541 A1 | 8/2009 | Chen et al. |
| 2009/0207542 A1 | 8/2009 | Carcouet |
| 2010/0019737 A1 | 1/2010 | Leboeuf |
| 2011/0204713 A1* | 8/2011 | Wenger .................. H02M 1/36 307/9.1 |

OTHER PUBLICATIONS

Krstic, S. et al., "Circuit Breaker Technologies for Advanced Ship Power Systems", Electric Ship Technologies Symposium, 2007, pp. 201-208.

* cited by examiner

US 9,711,966 B2

METHOD AND DEVICE FOR MONITORING A CONVERTER

FIELD OF THE INVENTION

The present invention relates to a converter, in particular a DC/DC converter for use in a motor vehicle as well as measures for detecting a fault current.

BACKGROUND INFORMATION

Converters generally have a number of semiconductor components using which, controlled by a suitable control unit, a direct voltage or alternating voltage from a first network applied at the input side may be converted into a direct voltage or alternating voltage of a second network supplied at the output side. For example, a DC/DC converter may have multiple half-bridge circuits connected in parallel to one another at the input side and at the output side.

In addition, input and output capacitors or intermediate-circuit capacitors may be provided for smoothing the input current and the output voltage.

Fault currents may occur in converters. For example, the fault currents may be caused by a reduction in the insulating resistance of the input and output capacitors. This may occur in particular when using ceramic capacitors (MLCC capacitors: multilayer ceramic capacitors), which have a comparatively high sensitivity to mechanical stresses. In addition, a fault current may occur due to defective semiconductor switches if they have an elevated cutoff current in the blocked state.

In particular when using the converter as a DC/DC converter, a shared ground potential is provided for the DC voltage networks connected through the DC/DC converter. To detect a fault current in the DC/DC converter, a fault current detector may therefore be provided between the shared ground potential and the converter circuit of the converter, as is already known from the publication German Published Patent Application No. 10 2008 041 341. Prior to activating the converter, there is a check on whether a fault current between the converter circuit of the converter and the ground potential is present prior to establishing a low-resistance connection between the converter circuit of the converter and the ground potential.

Such a configuration has the disadvantage that a node, which has a fluctuating potential prior to the activation of the converter, is created between the converter circuit of the converter and the ground potential. This may result in undesirable voltage potentials. In addition, shared-mode interference may occur due to the increased resistance to the ground potential, possibly causing interference with regard to the electromagnetic compatibility (EMC) of the entire converter.

SUMMARY

An object of the present invention is to make available a method and a device for monitoring a converter for detecting fault currents, in which the disadvantages of the related art may be avoided.

This object is achieved by the converter having monitoring with regard to a fault current and by the method for monitoring a converter.

According to a first aspect, a converter, in particular a DC/DC converter, is provided for use in a motor vehicle. The converter includes:

a converter circuit, situated between a first network and a second network to convert a direct voltage or alternating voltage at an input terminal at the input side into a direct voltage or alternating voltage at an output terminal at the output side, the direct voltage or alternating voltage at the input side and the direct voltage or alternating voltage at the output side being based on a shared potential;

a first monitoring circuit, which is situated between the input terminal and the converter circuit, to detect a current flow into the converter circuit;

a second monitoring circuit, which is situated between the output terminal and the converter circuit, to detect a current flow into the converter circuit;

a first separation element, which is situated between the input terminal and the converter circuit, to establish a connection between the input terminal and the converter circuit, depending on the current flow detected by the first monitoring circuit and/or a second separation element, which is situated between the output terminal and the converter circuit, to establish a connection between the output terminal and the converter circuit, depending on the current flow detected by the second monitoring circuit.

One idea of the present invention is to monitor a converter for fault currents, in which two networks interconnected via the converter have a shared potential, by conducting current measurements of currents, which are different from the shared potential, through the input terminal and the output terminal. When a current flow above a predefined threshold value is detected in the case of a deactivated converter, a fault current through the converter is recognized.

In addition, separation devices between the input terminal and the converter circuit as well as between the output terminal and the converter circuit are provided to put the converter in a secure operating state upon detection of a fault current and in particular to suppress activation of the converter. It is therefore possible to connect the converter circuit of the converter directly to the shared potential without having to provide a monitoring element or separation element between the converter and the shared potential. The resistance between the converter and the shared potential may therefore be reduced, so that shared-mode interference may be reduced and the electromagnetic compatibility may be improved. Furthermore, it is possible, by providing measuring equipment in each network, to detect fault currents in correlation with the corresponding network.

In addition, a control unit may be provided, which is designed to suppress activation of the converter as a function of a current flow detected in the first and/or second monitoring circuit.

According to another specific embodiment, the first monitoring circuit and the first separation element may be connected in parallel to one another and/or the second monitoring circuit and the second separation element may be connected in parallel to one another.

The shared potential may be applied to a shared potential line to which the converter circuit is connected directly, i.e., without any electronic components in between.

It may be provided for the converter circuit to include one or multiple half-bridges, which are connected between the first monitoring circuit and the shared potential.

In addition, the shared potential may be applied to a shared potential line, to which the converter circuit is connected via a measuring shunt.

According to one specific embodiment, the first and/or second separation element may have in particular a parallel external diode or an integrated diode to enable or prevent a current flow from the network assigned to the separation element into the converter circuit, independently of the switching status of the respective separation element in particular.

According to another aspect, a method is provided for operating the above-mentioned converter, triggering of the first and/or second separation element for closing the respective separation element and/or switching elements of the half-bridges being suppressed as a function of a current flow detected in the first and/or second monitoring circuit.

DETAILED DESCRIPTION

Figure 1:
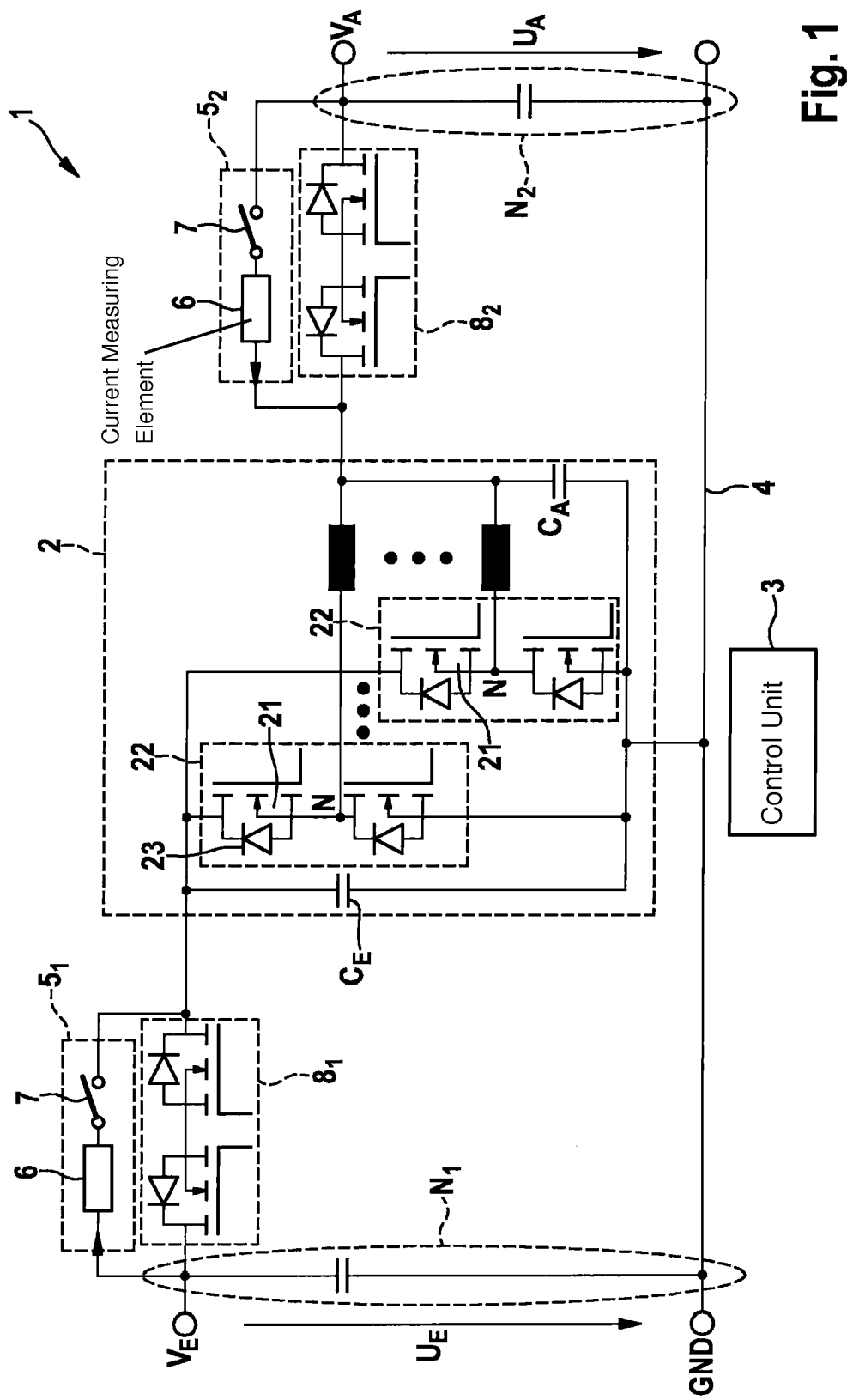
FIG. 1 shows a circuit diagram including a converter and detection and separation circuits situated on the network potential lines for two different networks.

FIG. 1 shows a circuit diagram of a converter 1 including a unit for monitoring for fault currents. Converter 1 includes a converter circuit 2, situated between a first network N1 and a second network N2. Networks N1 and N2 may correspond to direct voltage and/or alternating voltage networks and may thus perform a DC/DC, AC/DC, DC/AC and AC/AC conversion, depending on the triggering of converter circuit 2.

In the exemplary embodiment described in the present case, monitoring of a converter 1 is described on the basis of a DC/DC converter.

Converter circuit 2 includes multiple semiconductor switches 21, which may be designed in the form of thyristors, IGBTs, IGCTs or power MOSFETs, for example. Each semiconductor switch 21 is provided with a free-wheeling diode 23, which is connected in parallel thereto, to conduct a free-wheeling current which is caused by a negative voltage applied via semiconductors circuits 21. Such a negative voltage may occur during operation or switching of inductive loads. Free-wheeling diodes 23 may also be present in suitably assigned semiconductor switches 21, as in MOSFETs, for physical reasons.

Semiconductor switches 21 are wired to half-bridges 22, which are triggered in a suitable way by a suitable control unit 3 to achieve a conversion of an input voltage $U_E$ into an output voltage $U_A$. Semiconductor switches 21 are generally triggered in such a way that they are either blocked or opened completely.

To increase the converter power, any number of half-bridges 22 connected in parallel to one another may be selected. Half-bridges 22 are connected in parallel at both the input side and output side. Half-bridges 22 may be triggered offset to one another in particular to achieve better smoothing of the input current and the output voltage.

Converter circuit 2 is provided at the input and output sides with an input capacitor $C_E$ and an output capacitor $C_A$ which are connected between the potential terminals for input voltage $U_E$ and output voltage $U_A$. Providing input capacitor $C_E$ and output capacitor $C_A$ helps to prevent interference in networks N1, N2 due to harmonic waves caused by switching of semiconductor switches 21. Additional capacitors may be present directly on the distributed phase-half-bridges to improve the switching performance of the semiconductor switches.

The energy flow through converter circuit 2 may be unidirectional or bidirectional, depending on the triggering of semiconductor switches 21 by control unit 3. Therefore, power may flow from the output side to the input side in the converter circuit shown in FIG. 1.

At the input side, input voltage $U_E$ between an input potential $V_E$ and a ground potential GND may be supplied at converter circuit 2. At the output side, converter circuit 2 supplies output voltage $U_A$ between an output potential $V_A$ and ground potential GND. Ground potential GND functions as the shared potential with respect to which input voltage $U_E$ and output voltage $U_A$ are supplied. Ground potential GND is supplied on a shared potential line 4 to which converter circuit 2 is directly connected.

Each of half-bridges 22 of converter circuit 2 is situated between input potential $V_E$ and ground potential GND, while nodes $N_1$ through $N_n$ are connected to one another between two semiconductor switches 21, which form each half-bridge 22 via converter inductances $L_1$ through $L_n$ to form output potential $V_A$ together. It is provided in particular that half-bridge circuits 22 are connected directly to input potential $V_E$ and to ground potential GND as the shared potential without any other components in between, and being connected to ground potential GND either directly or via a low-resistance measuring shunt for measuring the current.

At the converter input, first network N1 is connected to input potential $V_E$ via a first monitoring circuit $5_1$. This means that monitoring circuit $5_1$ is connected serially to the current path on the input side. Similarly, a second monitoring circuit $5_2$ is provided, which is connected serially to the output current path between converter circuit 2 and second network N2.

Each of monitoring circuits $5_1$, $5_2$ has a current measuring element 6 to detect a current flow into converter circuit 2. Current measuring element 6 may be designed, for example, as a measuring shunt or in some other way to supply information about the flowing current. Analysis of the current flowing through current measuring element 6 into converter circuit 2 may be carried out by control unit 3, for example, by digitizing a measuring voltage caused, due to the current flow through current measuring element 6, to obtain digitized data about the current flow.

To avoid a high current flow through monitoring circuits $5_1$, $5_2$, current measuring element 6 may be connected in series with a particular switch 7, which is opened in the deactivated state of converter 1.

A first and a second separation element $8_1$, $8_2$, which allow or interrupt current flow to or from converter circuit 2, depending on the switching status, are provided in parallel to monitoring circuit $5_1$, $5_2$. Separation elements $8_1$, $8_2$ may be designed as semiconductor components or having an electromechanical relay or the like. Blocking of the current flow may be unidirectional or bidirectional. In the case of a unidirectional design of separation element $8_1$, $8_2$, a semiconductor element, which is provided with a diode connected in parallel, may be provided to suppress current flow into the converter circuit, regardless of the switching status of the semiconductor element. If the blocking is to be bidirectional, two semiconductor elements connected in series may be provided, each being provided with a diode connected in parallel, the diode being oppositely polarized to prevent a current flow in both directions of current when the semiconductor switching elements are opened.

Figure 2:
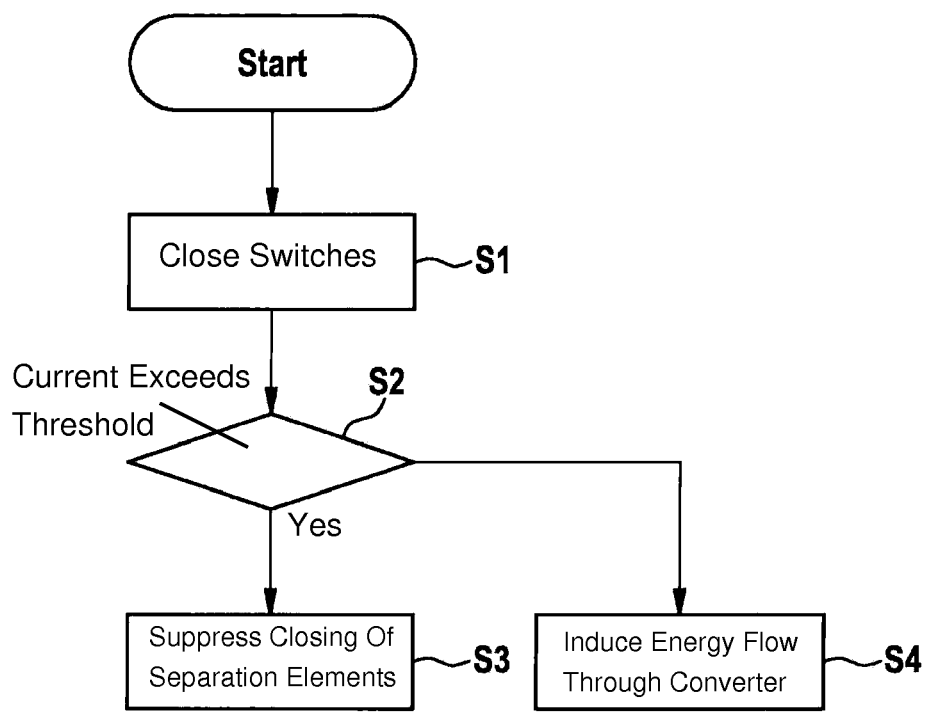
FIG. 2 shows a method, which is carried out in the control unit, for monitoring the converter for fault currents.

Control unit 3 carries out the monitoring prior to activation of converter 1. The method carried out in control unit 3 is explained below with reference to the flow chart in FIG. 2.

An inactive state of converter 1, in which switches 7 and separation elements $8_1$, $8_2$ are open, is assumed. Monitoring is carried out initially if activation of converter 1 is intended.

To carry out the monitoring, switches 7 are closed when separation elements $8_1$, $8_2$ are opened according to step S1 and a corresponding current measurement is carried out with the aid of current measuring elements 6 by converter circuit 2, which is not being actively operated. The current measurement in step S1 is preferably carried out immediately prior to starting converter 1. In the deactivated state, and as long as no active triggering of converter circuit 2 is provided, switches 7 should be open to prevent an undesirable current flow through deactivated converter circuit 2.

If converter circuit 2 contains defective capacitors whose forward resistance is too low and/or a semiconductor switch 21, whose forward resistance is too low in the blocking state, this affects a corresponding elevated current flow through current measuring element 6 of at least one of monitoring circuits $5_1$, $5_2$ from one of networks N1, N2 through converter circuit 2 to shared ground potential GND. This current flow is detected by current measuring element 6 and in step S2 there is a query of whether at least one of the detected current values exceeds a predefined threshold value. If this is the case (alternative: yes), then in step S3, closing of separation elements $8_1$, $8_2$ is suppressed and converter circuit 2 is brought into a safe fault state. Activation of converter 1 is thus suppressed.

If it is found in step S2 that the current flow is 0 or is below the predefined threshold value, a functioning converter circuit 2 is deduced and closing of separation elements $8_1$, $8_2$ for activation of converter 1 is allowed, to allow a current path from first network N1 to converter circuit 2 or from second network N2 to converter circuit 2. Control unit 3 may then operate converter circuit 2 in a suitable manner in step S4 to induce an energy flow through converter 1 from first network N1 to second network N2 or vice versa. It may be provided that circuit 7 of monitoring circuits $5_1$, $5_2$ remains closed when it is found in step S2 that the currents flowing through converter circuit 2 are below the predefined fault threshold.

However, an elevated current flow through shunts 6 could also be caused by a normal charging current into input capacitor $C_E$ and/or output capacitor $C_A$ which flows until input capacitor $C_E$ and/or output capacitor $C_A$ has/have been charged to potentials $V_E$ and $V_A$ and there is no fault state. To differentiate this case of natural charge equalization from a fault current, it might be necessary to charge input capacitor $C_E$ and/or output capacitor $C_A$ to corresponding potential $V_E$ or $V_A$ by temporarily switching on switches $8_1$ and $8_2$ or through an additional equalizing device connected in parallel and thus to establish a charge equalization between potential $V_E$ and input capacitance $C_E$ or potential $V_A$ and output capacitance $C_A$. This procedure may have to be carried out several times. If a current is still detected at shunts 6 above the defined limiting value after a defined number of these switching operations to charge input capacitor $C_E$ or output capacitor $C_A$, then there is a fault state in converter circuit 2.

The advantage of the configuration of monitoring circuits $5_1$, $5_2$ in feeder lines different from the shared potential, via which input potential $V_E$ and output potential $V_A$ are supplied to converter circuit 2, is that the resistance between converter circuit 2 and ground potential GND may be reduced and thus shared-mode interference may be reduced by reducing the resistance to ground potential GND. In addition, floating potentials in converter circuit 2 may be prevented since each semiconductor switch 21 has a defined potential also in the deactivated state.

What is claimed is:

1. A converter, including:
   a converter circuit situated between a first network and a second network and for converting one of a direct voltage and an alternating voltage at an input terminal at an input side into one of a direct voltage and an alternating voltage at an output terminal at an output side, the one of the direct voltage and the alternating voltage at the input side and the one of the direct voltage and the alternating voltage at the output side each being based on a shared potential;
   a first monitoring circuit situated between the input terminal and the converter circuit and configured to detect a current flow into the converter circuit at the input terminal when the converter circuit is deactivated;
   a second monitoring circuit situated between the output terminal and the converter circuit and configured to detect a current flow into the converter circuit at the output terminal when the converter circuit is deactivated; and
   at least one of:
      a first separation element situated between the input terminal and the converter circuit and for establishing a connection between the input terminal and the converter circuit as a function of the current flow detected by the first monitoring circuit, and
      a second separation element situated between the output terminal and the converter circuit and for establishing a connection between the output terminal and the converter circuit as a function of the current flow detected by the second monitoring circuit.

2. The converter as recited in claim 1, wherein the converter is a DC/DC converter for use in a motor vehicle.

3. The converter as recited in claim 1, further comprising:
   a control unit for suppressing an activation of the converter as a function of the current flow detected in at least one of the first monitoring circuit and the second monitoring circuit.

4. The converter as recited in claim 1, wherein at least one of:
   the first monitoring circuit and the first separation element are connected in parallel with one another, and
   the second monitoring circuit and the second separation element are connected in parallel with one another.

5. The converter as recited in claim 1, wherein the shared potential is applied to a shared potential line to which the converter circuit is connected directly.

6. The converter as recited in claim 1, wherein the shared potential is applied to a shared potential line to which the converter circuit is connected via a measuring shunt.

7. The converter as recited in claim 1, wherein the converter circuit includes at least one half-bridges connected between the first monitoring circuit and the shared potential.

8. The converter as recited in claim 1, wherein at least one of the first separation element and the second separation element one of enables and suppresses a current flow from a network assigned to the respective separation element into the converter circuit, independently of a switching status of the respective separation element.

9. The converter circuit as recited in claim 8, wherein at least one of the first separation element and the second separation element includes a diode connected in parallel.

10. A method for operating a converter that includes a converter circuit situated between a first network and a second network and for converting one of a direct voltage and an alternating voltage at an input terminal at an input side into one of a direct voltage and an alternating voltage at an output terminal at an output side, the one of the direct voltage and the alternating voltage at the input side and the one of the direct voltage and the alternating voltage at the output side each being based on a shared potential; a first monitoring circuit situated between the input terminal and the converter circuit and configured to detect a current flow into the converter circuit at the input terminal; a second monitoring circuit situated between the output terminal and the converter circuit and configured to detect the current flow into the converter circuit at the output terminal; and at least one of: a first separation element situated between the input terminal and the converter circuit and for establishing a connection between the input terminal and the converter circuit as a function of the current flow detected by the first monitoring circuit, and a second separation element situated between the output terminal and the converter circuit and for establishing a connection between the output terminal and the converter circuit as a function of the current flow detected by the second monitoring circuit, the method comprising:

suppressing a triggering of at least one of the first separation element and the second separation element for closing at least one of a respective separation element and switch elements of half-bridges, the suppressing being performed depending on a current flow detected in at least one of the first monitoring circuit and the second monitoring circuit when the converter circuit is deactivated.

11. A converter, including:
a converter circuit situated between a first network and a second network and for converting one of a direct voltage and an alternating voltage at an input terminal at an input side into one of a direct voltage and an alternating voltage at an output terminal at an output side, the one of the direct voltage and the alternating voltage at the input side and the one of the direct voltage and the alternating voltage at the output side each being based on a shared potential;
a first monitoring circuit situated between the input terminal and the converter circuit and for detecting a current flow into the converter circuit at the input terminal;
a second monitoring circuit situated between the output terminal and the converter circuit and for detecting the current flow into the converter circuit at the output terminal; and
at least one of:
a first separation element situated between the input terminal and the converter circuit and for establishing a connection between the input terminal and the converter circuit as a function of the current flow detected by the first monitoring circuit, and
a second separation element situated between the output terminal and the converter circuit and for establishing a connection between the output terminal and the converter circuit as a function of the current flow detected by the second monitoring circuit,
wherein at least one of:
the first monitoring circuit and the first separation element are connected in parallel with one another, and
the second monitoring circuit and the second separation element are connected in parallel with one another.

* * * * *